United States Patent Office 3,409,409
Patented Nov. 5, 1968

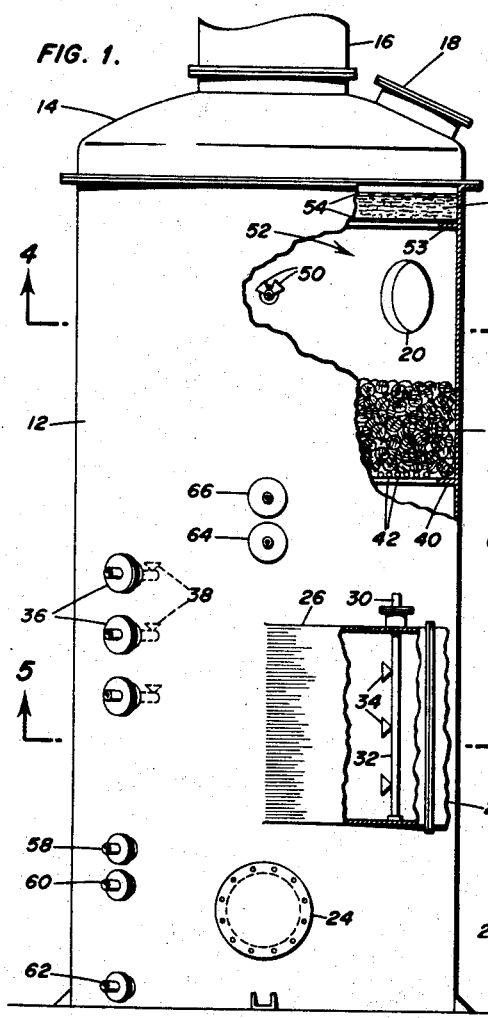

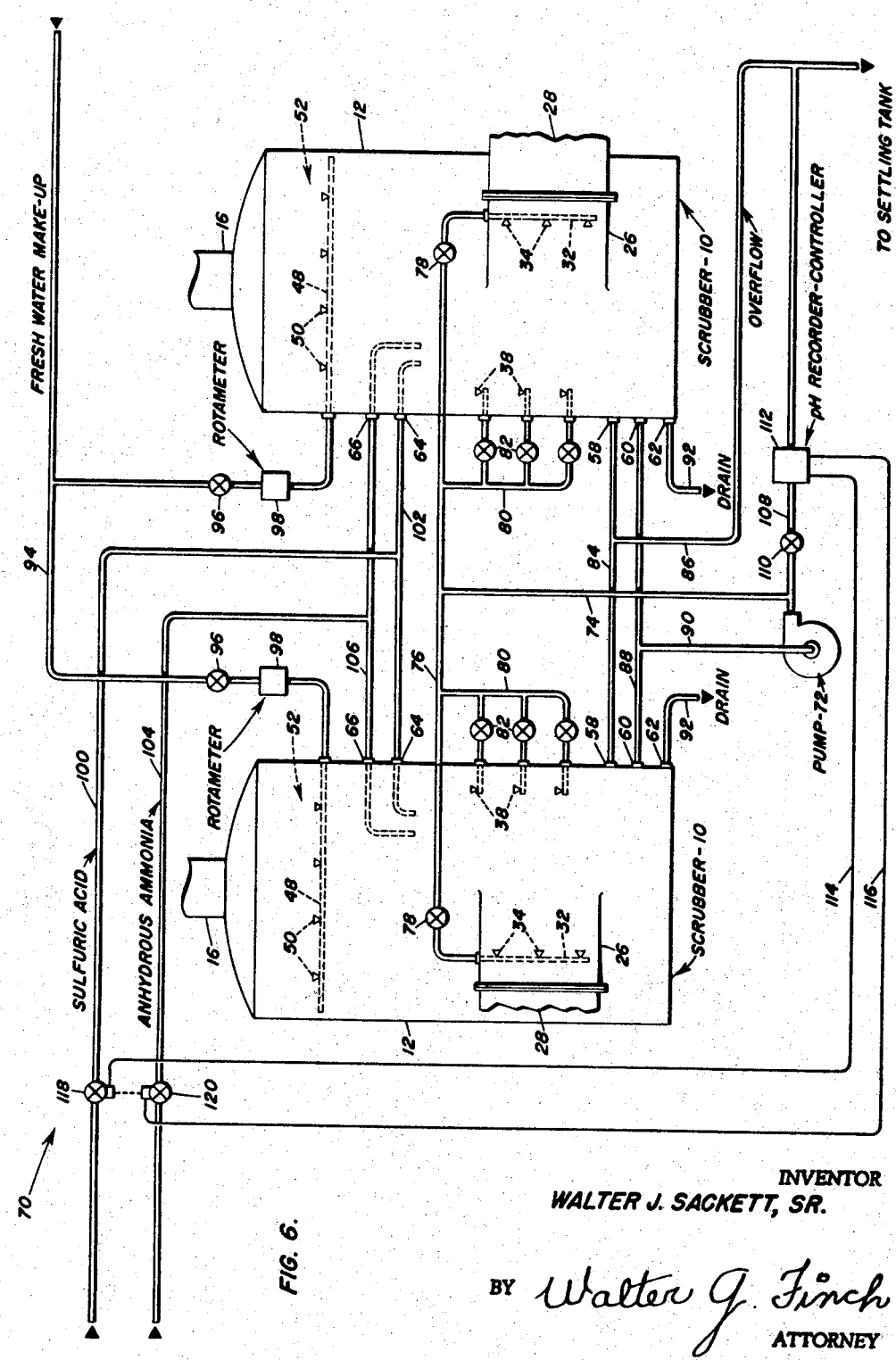

3,409,409
CONTROLLED pH SCRUBBER SYSTEM
Walter J. Sackett, Sr., 3700 Echodale Ave.,
Baltimore, Md. 21206
Filed Apr. 22, 1966, Ser. No. 551,482
3 Claims. (Cl. 23—283)

ABSTRACT OF THE DISCLOSURE

A vertical tank is provided with a tangential inlet in the side of the tank and an outlet in its top for passing air through the tank; spaced filters are positioned within the tank in the path of air, sprayers spray the air as it passes between the filters with clean water, with this water being collected in the bottom of the tank, and with a pump withdrawing the water from the bottom of the tank and supplying it to other sprayers spraying the air as it passes from the inlet to the filter closest to the inlet, with supply lines being positioned within the tank between the lowermost filter and the inlet for supplying modifying chemical.

---

This invention relates generally to gas liquid contact apparatus, and more particularly it pertains to a controlled pH scrubber system for clarifying large volumes of dust-entrained air of particles and chemicals encountered in manufacturing processes before discharging it into the atmosphere.

When dust-laden gases are released in manufacturing procedures, it is always a problem to quickly and continuously dispose of them. In most processing, those gases are mixed with air in large quantity, and it is most economical to vent them to the atmosphere. However, air pollution regulations are becoming more critical of such practice and it now is mandatory that before discharge, the air is rendered essentially clean, dry and free of harmful elements, such as particles and chemicals.

Accordingly, it is a principal object of this invention to provide a controlled pH scrubber system for rendering exhaust gases from industrial processes fit to discharge into the atmosphere.

Another object of this invention is to provide a wet wall scrubber tower in combination with a controlled pH scrubber system which operates in a tangential flow principle.

Yet another object of this invention is to provide improved gas-to-scrub-liquid contact in a controlled pH gas treatment apparatus.

To provide a controlled pH scrubbing system for gas which discharges inert, mist-free and particle-free inoffensive gas from an input of chemically reactive gases is still another object of this invention.

Another object of this invention is to provide an efficiently controlled pH chemical reaction tower system which is adaptable to a wide variety of gas-to-liquid reactive processes in the chemical industry.

Other objects and attendant advantages of this invention will become more readily apparent and understood from the following detailed specification and accompanying drawings in which:

FIGS. 1, 2, and 3 are front, side and plan views of a controlled pH scrubber system embodying features of this invention;

FIG. 6 is a schematic diagram illustrating a typical installation of a pair of improved controlled pH scrubber systems.

Figure 4:
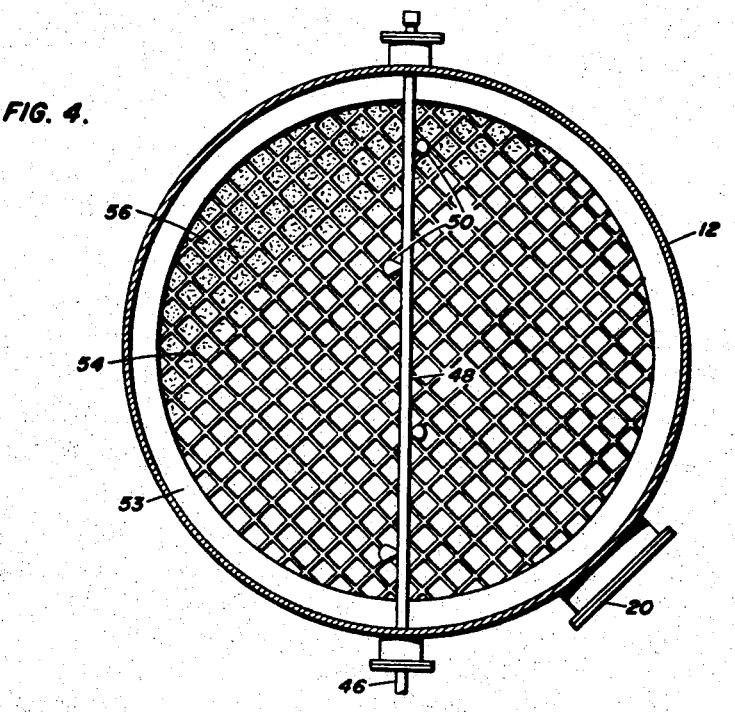
FIG. 4 is a cross section viewed in the direction of the arrows 4—4 of FIG. 1.

Referring now to the details of the invention as shown in FIGS. 1, 2, and 3, reference numeral 10 indicates generally a scrubber. This scrubber 10 is of the wet wall, tangential type and best constructed entirely of a plastic material such as a polyester reinforced fibre glass. It comprises a vertically erected cylindrical tank 12 having a dome 14. The dome 14 is centrally apertured for a flange-connected exhaust pipe 16.

About a third of the way up from the bottom of the tank 12, there is provided a vertically elongated gas inlet and sprayhead box 26 open to the interior and flanged on its narrow end for an inlet pipe 28. It is to be noted from FIG. 5 that the sprayhead box 26 directs input gas tangentially to the interior surface of the tank 12 and further houses a vertical manifold 32 equipped with tangentially inward-directed sprayheads 34. The upper end of the manifold 32 is provided with a pipe fitting 30.

Other sprayheads 38 are located on the wall of the tank 12 ahead of and somewhat above the sprayheads 34. These sprayheads 38 are directed upwardly inside of the tank 12 and are provided with outside pipe fittings 36.

Figure 5:
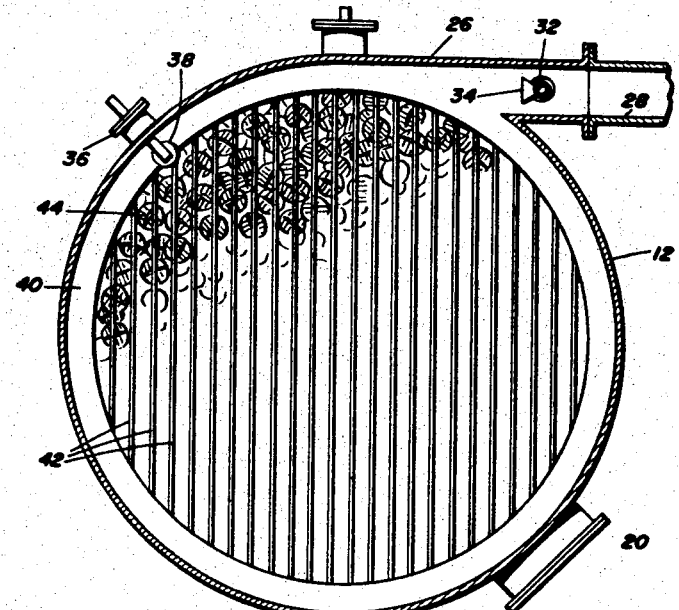
FIG. 5 is a cross section viewed in the direction of the arrows 5—5 of FIG. 1.

The upper third of the tank 12 is occupied by a demister open area 52 which is defined by a plastic grid 54 above mounted on a circular flange 53 and a thick bed below of multi-surface saddle packing elements 44 of plastic material or, if desired, pebbles, marbles, etc. As best shown in FIG. 5 these plastic saddle packing elements 44 rest upon a grille 42 made up of a plurality of spaced, plastic coated steel rods supported by another flange 40.

A manifold 48 consisting of a diametrical pipe extending horizontally through the tank 12 mounts a plurality of staggered sprayheads 50 directed at various angles of discharge into area 52. A pipe fitting 46 is provided on the exterior for this manifold 48, as shown best in FIG. 4.

Resting on the plastic grid 54 and covered by another similar grid 54, there is provided a loose fibre glass mat 56. The upper grid 54 is open to the dome 14.

The lowermost portion of the tank 12 has three outlets; in descending order of location: an overflow fitting 58, a pump connection fitting 60, and at the bottom, a drain fitting 62.

The dome 14 is accessible by means of a covered manhole 18, and the demister area 52 by means of similar manhole 20. The central portion of tank 12 may be entered through a covered manhole 22 and the lowermost portion through manhole 24. All manholes 18, 20, 22 and 24 are of similar flange type construction with peripherally bolted cover plate as illustrated at reference 24.

With reference to FIG. 6, the scrubber 10 is advantageously used in pairs. Thus one unit can be shut down for cleaning without interrupting continuous processing. All piping as will now be described is effectively in parallel to the two scrubbers 10.

Fresh water from make-up line 94 is initially introduced to the tank 12 through sprayheads 50. This flow of water may be metered and controlled by rotameter 98 and valve 96 as required. After a certain level of liquid collects in the lower portion of tank 12, a recirculating pump 72 is started and withdraws water from pump-return-pipes 88, 90 and outlet fitting 60. The pressure line 74 from pump 72 feeds recirculating liquid through pipe 76 to the tangential sprayheads 34 (controlled by valve 78) and to the upwardly directed sprayheads 38 on piping 80. These sprayheads 38 are controlled by valves 82.

The air or gas flow being treated enters inlet 28 and is given a tangential path which becomes helical upwardly under the influence of these two sets of sprayheads 34 and 38, respectively.

At this point, the tank 12 may be equipped with inlets 64 and 66 which are fed by lines 100, 102 and 104, 106 respectively, to introduce a spray or sprays of some modifying or de-odorizing chemical, if desired, or the desired chemical to control the pH value of the liquid so as to render it neutral from an alkaline or acid pH condition.

It is to be noted that the gas being treated encounters a thoroughly wetted bed of the multi-surfaced plastic saddle type elements 44 as it passes upwardly. In the demister area 52, it is subjected only to clean water spray and not that which is re-circulated. Any fine mist constituent is blocked by the fibre glass mat 56 and only mist-free air leaves the exhaust 16.

The scrubber 10 may be completely emptied of fluid if desired by means of drain pipe 92 connected to lowermost fitting 62. Water contaminated with suspended solids etc. is drawn off by overflow pipe 84 connected to fitting 58 and is directed through pipe 86 to a settling tank (not shown).

A branch 108 from the pressure line 74 of pump 72 may be used with flow controlled by valve 110 for sampling a portion of liquid being discharged. An instrument 112 may optionally be inserted at this point to automatically control valves 118, 120 over signal wires 114 and 116. Thus, any modifying chemical can be automatically valved into the scrubber 10 over supply lines 100, 104 as required to maintain a desired low pH condition, such as alkaline, acid or neutral in the reacted or treated discharged products.

Obviously many modifications and variations of the present invention are possible in light of the above teachings. It is, therefore, to be understood that within the scope of the appended claims the invention may be practiced otherwise than as specifically described.

What is claimed is:

1. A scrubber for removing dust from and modifying a gas comprising a tower having a tangentially aligned bottom inlet structure and a vertical cylindrical wet wall reaction chamber, the chamber being bounded at the upper end by a multi-layer filter having first and second vertically spaced apart filter beds and at the lower end by a body of liquid, the liquid including reagent for recirculation through a conduit having a recirculation pump therein, to plural outlets in the chamber; a tangentially aligned first jet pump fixed within the inlet, fluidly connected to said recirculation pump and contacting the gas with recirculated reactant, pumping the gas into the chamber and tangentially impinging the gas on an area of the wall thereof; an upwardly aligned jet pump affixed within the chamber in proximity to the upper part of the gas impingement area of the chamber wall; said second jet pump fluidly communicating with said recirculation pump and drenching the impingement area of the wall with recirculated reactant downwash from the recirculation pump and pumps the impinged gas upwardly into rising circular flow in the chamber; all said jet pumps having connection through said conduit and said recirculation pump to the said body of liquid; a supply of a first clean basic reactant; a first downwardly directed spray nozzle in said chamber above said jet pumps, said first spray nozzle being fluidly connected to said supply of basic reactant, said first spray nozzle being fixed in subjacent proximity to said first filter bed and distributing first clean reactant atop the rising circular-flowing body of gas for reaction with residual elements thereof preparatory to exit of the gas from the chamber through the multi-layer filter; a second supply of second clean acidic reactant, said second reactant being chemically different from said first reactant; a second downwardly directed spray nozzle in said chamber above said jet pumps, said second spray nozzle being fluidly connected to said supply of second clean reactant, said second spray nozzle being fixed in subjacent proximity to said first filter bed and distributing second clean reactant atop the rising circular-flowing body of gas for reaction with residual elements thereof preparatory to exit of the gas from the chamber through the multi-layer filter; an upwardly aligned and directed water third jet pump, having a connection to a clean-water supply, affixed above the first filter bed and below the second filter bed and wetting the first filter bed and drawing gas upward through the wet first filter bed and spray-wetting the gas preparatory to expelling it from the scrubber; said third jet pump comprising a plurality of upwardly directed and aligned water jets; a device sensitive to the pH of the recirculated liquid; said device being fluidly connected by a valved conduit to the outlet of said recirculation pump and receiving liquid from said recirculation pump; a first valve in the fluid connection between said first clean reactant supply and said first spray nozzle; a second valve in the fluid connection between said second clean reactant supply and said second spray nozzle; control means connected to said pH sensitive device and responsive to changes in pH sensed by said pH sensitive device, said control means connected to said first and second valves and opening and closing the same in response to changes in pH sensed by said pH sensitive device for maintaining a constant pH in the recirculated liquid, an overflow drain positioned below said inlet for preventing the surface of said body of liquid from rising above said drain; and said tower having an axial clean gas outlet at its upper end above said second filter bed.

2. In a scrubber as recited in claim 1, the said tangentially aligned inlet structure being vertically elongate; and the said first jet pump comprising a plurality of jets fixed in respective vertical relation and all of said jets of said first jet pump are in parallel.

3. In a scrubber as recited in claim 2, the said upwardly aligned second jet pump being a multi-stage jet pump comprising a plurality of jets fixed in vertical co-axial relation proximate to the said wall; whereby all of said jets of said second jet pump pump in series upwardly along the wall.

References Cited

UNITED STATES PATENTS

| | | | |
|---|---|---|---|
| 1,504,386 | 8/1924 | Senseman | 55—236 |
| 1,758,983 | 5/1930 | Seymour | 261—79 |
| 2,281,254 | 4/1942 | Anthony | 261—79 |
| 2,387,473 | 10/1945 | Spitzka | 55—223 |
| 2,523,441 | 9/1950 | McKamy | 261—79 X |
| 2,604,185 | 7/1952 | Johnstone et al. | 55—237 X |
| 2,776,122 | 6/1957 | Hultman | 261—79 |
| 2,813,000 | 11/1957 | Quittenton | 23—2 |
| 2,843,138 | 7/1958 | Gilman | 210—96 X |
| 2,989,037 | 6/1961 | Filippino | 210—96 X |
| 3,028,295 | 4/1962 | Trobeck et al. | 23—2 X |
| 3,064,408 | 11/1962 | Erga et al. | 55—258 X |
| 3,135,592 | 6/1964 | Feirs et al. | 261—95 X |
| 3,149,907 | 9/1964 | Kawat | 23—2 |
| 3,151,187 | 9/1964 | Comte | 201—98 X |
| 3,142,548 | 7/1964 | Krantz | 55—259 X |
| 3,315,445 | 4/1967 | De Seversky | 55—257 X |

FOREIGN PATENTS

| | | |
|---|---|---|
| 879,839 | 12/1942 | France. |
| 341,058 | 1/1931 | Great Britain. |

OTHER REFERENCES

Support Plates Distributors and Hold-Down Plates, U.S. Stoneware Co. (A), Akron 9, Ohio, Design Manual TA-40R, Published April 1961, page 15.

Support Plates and Distributors for Packed Towers, U.S. Stoneware Co. (E), Akron, Ohio, Bulletin TA-30, Copyright 1957, page 2.

Aerotec Wet Scrubbers, Arotec Industries, Inc. (D), Greenwich, Conn., received Dec. 19, 1963, page 5.

HARRY B. THORTON, *Primary Examiner.*

D. TALBERT, *Assistant Examiner.*